United States Patent [19]
Yoshimatsu

[11] Patent Number: 5,847,538
[45] Date of Patent: Dec. 8, 1998

[54] CONTROL CIRCUIT FOR PROTECTING AN EXCESS DISCHARGE OF A BATTERY

[75] Inventor: Morio Yoshimatsu, Kanagawa, Japan

[73] Assignee: Sony Corporation, Tokyo, Japan

[21] Appl. No.: 536,456

[22] Filed: Sep. 29, 1995

[30] Foreign Application Priority Data

Oct. 11, 1994 [JP] Japan ................................. 6-245462
Dec. 28, 1994 [JP] Japan ................................. 6-327869

[51] Int. Cl.$^6$ ................................................. H01M 10/46
[52] U.S. Cl. .................................. 320/5; 320/35; 320/39
[58] Field of Search ................................ 320/5, 13, 35, 320/39

[56] References Cited

U.S. PATENT DOCUMENTS

| | | | |
|---|---|---|---|
| 5,304,915 | 4/1994 | Sanpei et al. | 320/13 X |
| 5,349,280 | 9/1994 | Kim . | |
| 5,477,124 | 12/1995 | Tamai | 320/13 |
| 5,477,130 | 12/1995 | Hashimoto et al. | 320/13 X |
| 5,493,197 | 2/1996 | Eguchi et al. | 320/5 |
| 5,554,919 | 9/1996 | Uchida | 320/14 |

FOREIGN PATENT DOCUMENTS 3822021  10/1989  Germany .

OTHER PUBLICATIONS

International Published Patent Application WO 90/09598 (Nagy).
Search and Examination Report.

Primary Examiner—Adolf Berhane
Assistant Examiner—Patrick B. Law
Attorney, Agent, or Firm—Jay H. Maioli

[57] ABSTRACT

An overcharge or excess discharge of a battery cell can be avoided by an electronic switch formed of a single transistor. A positive electrode of a battery cell (3) is connected to a positive connection terminal (1). A negative electrode is grounded and connected through a transistor (4) to a negative connection terminal (2). When a terminal voltage of the battery cell (3) is a detected to be a predetermined voltage or greater, an output from a detecting circuit (5) is supplied through a series circuit of two resistors (6), (7) and a positive temperature coefficient resistor (PTC) (8) to the base of the single transistor (4) and supplied to power supply terminals of two comparators (9), (10). Further, voltage-divided outputs of two resistors (11), (12) and the negative connection terminal (2) are respectively connected through two resistors (13),(14) to positive and negative input terminals of the comparators (9), (10). The outputs of the comparators (9), (10) are connected through two transistors (15), (16) to a junction between the two resistors (6) and (7). The output from one of the comparators (9) is grounded through a fourth transistor (17) and the base of the fourth transistor (17) is grounded and connected to the connection terminal (2) through two additional resistors (18), (19).

8 Claims, 2 Drawing Sheets

CONTROL CIRCUIT FOR PROTECTING AN EXCESS DISCHARGE OF A BATTERY

BACKGROUND OF THE INVENTION

The present invention relates to a control circuit for protecting an excess discharge of a battery and, particularly to a battery protection circuit housed in a so-called battery pack, in a battery charger, or in devices driven by a battery.

Self-discharge amounts of battery packs are very small even after they have been left for a long time. Under normal room temperature circumstances, the battery packs are never entered into the excess discharge region even after they had been left about a year. If however the battery packs are not in use and left under the condition that they are electrically connected to some audio and video devices, such as a video camera, then a dark current of about 2 to 20 mA flows even though the power switch of the video camera has been turned off. As a consequence, the battery packs reach the excess discharge region within about one to six months. The battery packs, in worst cases, will not recover from the excess discharge state even with help of the ordinary battery charger.

To solve the above-mentioned problem, a proposed battery pack houses a battery protection circuit to protect the battery from overcharge and excess discharge. Specifically, the battery protection circuit includes an electronic switch connected in series between one of respective positive and negative connection terminals connected with a load or a battery charger and a battery cell. The battery protection circuit can protect the battery pack from overcharge or excess discharge by use of this electronic switch.

In the above-mentioned battery protection circuit, when the battery pack is discharged by the load connected to the positive and negative connection terminals or the battery pack is charged by the battery charger connected to the positive and negative connection terminals, a current flows in the battery protection circuit in the respective opposite directions. Accordingly, the above-mentioned electronic switch uses a field effect transistor (FET) which enables a current to flow in the two directions opposite to each other. Alternatively, the electronic switch uses transistors of positive and negative directions connected in parallel to each other to enable a current to flow in the two directions opposite to each other when the battery pack is discharged or charged.

Further, in order to protect the battery pack from overcharge, the battery protection circuit uses some suitable means, such as a thermostatic switch for detecting a temperature of a battery cell and opening and closing the circuit based on a detected result. Further, a detector for detecting charge and discharge includes a resistor connected in series to a power supply. A resistance value of this resistor is selected to be sufficiently small so as not to affect the output of the detector. To avoid the battery from being discharged excessively, the charge and discharge detector is formed of a suitable means, such as a CMOS (complementary metal oxide semiconductor) circuit whose power consumption is small.

However, the above-mentioned battery protection circuit uses the FET, the thermostatic switch, the resistor having low resistance value and the CMOS circuit all of which are relatively expensive circuit elements. Moreover, in order to drive the transistors connected in parallel under predetermined conditions, respectively, there has to be provided a complicated circuit arrangement. Therefore, if the battery pack incorporates therein the above battery protection circuit, then it is unavoidable that the battery pack becomes expensive.

Further, when the battery protection circuit uses the temperature detecting circuit, such as the thermostatic switch in order to prevent overcharge, if the battery protection circuit is placed in the abnormal load state, such as short-circuits repeatedly occurring between the positive and negative connection terminals, then the temperature detecting circuit chatters and an operation temperature exceeds a predetermined temperature. There is then the risk that the battery protection circuit will not be operated normally.

SUMMARY OF THE INVENTION

In view of the aforesaid aspect, it is an object of the present invention to provide a battery protection circuit which can protect a battery from overcharge and excess discharge satisfactorily.

It is another object of the present invention to provide a battery protection circuit which can be made to be inexpensive.

It is still another object of the present invention to provide a battery protection circuit in which an undesirable dark current can be prevented from flowing.

It is a further object of the present invention to provide a battery protection circuit which can be made stable and safe.

According to an aspect of the present invention, there is provided a battery protection circuit which is comprised of positive and negative connection terminals to which a load or battery charger is connected, a battery cell, an electronic switch connected in series between one of the connection terminals and the battery cell and a detecting circuit for detecting a predetermined terminal voltage of the battery cell, wherein when it is detected by the detecting circuit that a terminal voltage of the battery cell is a predetermined value or greater, a very small current flows from the detecting circuit to the electronic switch to change one terminal voltage of the electronic switch obtained when the load or battery charger is connected to the positive and negative connection terminals and the supply of current from the battery cell to the load or the supply of a charging current from the battery charger to the battery cell is effected by increasing a control voltage of the electronic switch in response to the change of the terminal voltage and wherein when it is detected by the detecting circuit that the terminal voltage of the battery cell is a predetermined value or smaller, a connection between one of the positive and negative connection terminals and the battery cell is disabled by interrupting the supply of a bias current to the electronic switch.

DETAILED DESCRIPTION OF THE PREFERRED EMBODIMENTS

The present invention will now be described with reference to the drawings.

Figure 1:
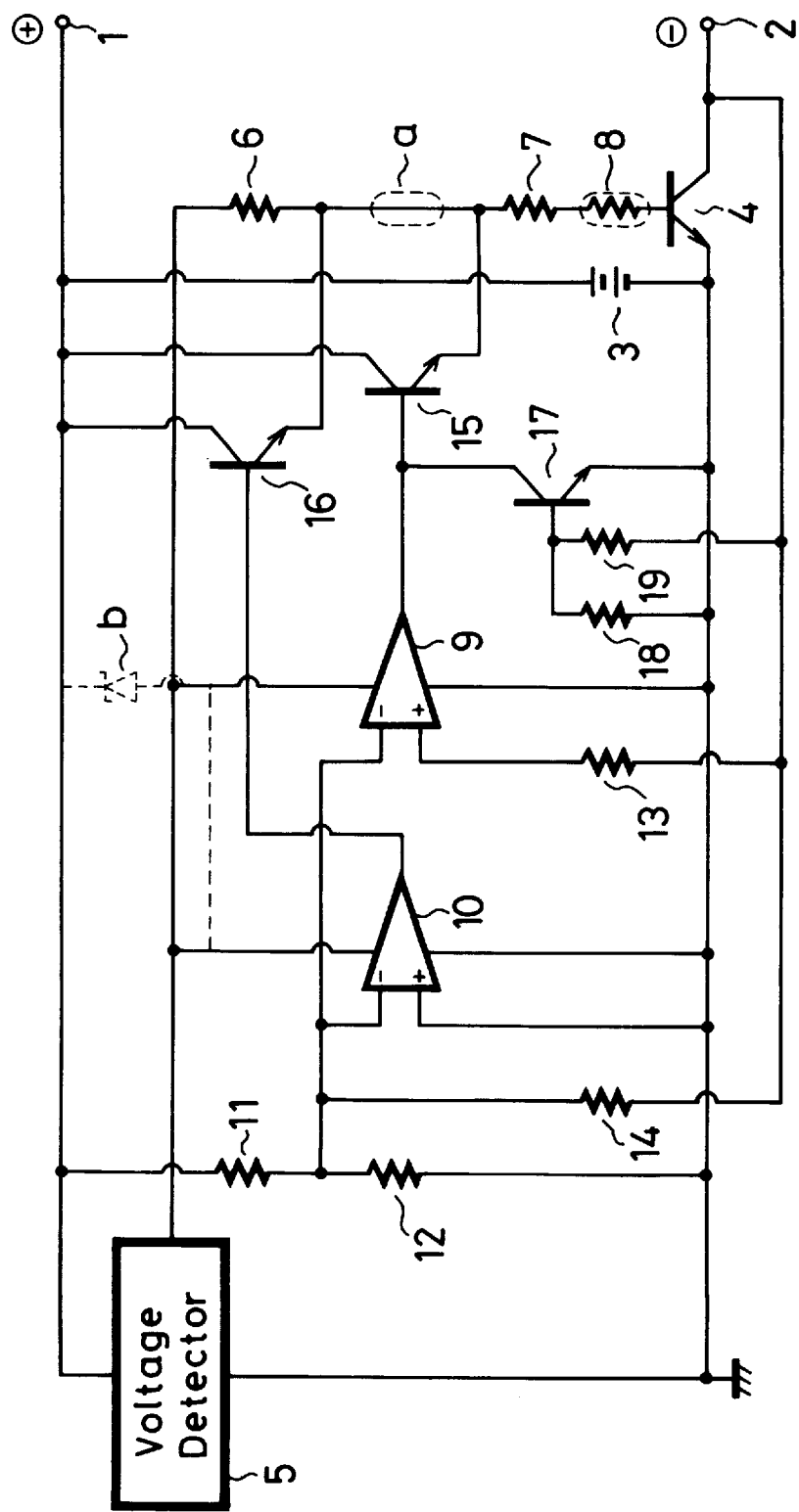
FIG. 1 is a diagram showing a circuit arrangement of a battery protection circuit according to a first embodiment of the present invention.

FIG. 1 is a diagram showing a circuit arrangement of a battery protection circuit according to a first embodiment of the present invention. As shown in FIG. 1, the battery protection circuit according to the present invention includes a positive connection terminal 1 and a negative connection terminal 2. A load or battery charger (not shown) is connected between the positive and negative connection terminals 1 and 2. There is provided a battery cell 3 whose positive electrode is connected to the positive connection terminal 1. A negative electrode of the battery cell 3 is grounded and connected to the emitter of an npn transistor 4. The collector of the npn transistor 4 is connected to the negative connection terminal 2.

There is provided a voltage detector 5. The voltage detector 5 is connected between the two electrode terminals of the battery cell 3. The voltage detector 5 outputs a high potential when it detects that a voltage across the terminals of the battery cell 3 is larger than a detection voltage (e.g., 5 Volts). An output of the voltage detector 5 is supplied through a series circuit of resistors 6, 7 and a positive temperature coefficient resistor (referred to hereinafter simply as "PTC") 8 to the base of the npn transistor 4. The output of the voltage detector 5 is connected to a power supply terminal of a comparator 9 forming a discharge control means and a power supply terminal of a comparator 10 forming a charge control means.

Voltage-dividing resistors 11, 12 are connected in series across the two electrodes of the battery cell 3. Divided outputs of the resistors 11, 12 are supplied to negative input terminals of the comparators 9, 10. A positive input terminal of the comparator 9 is connected through a resistor 13 to the negative connection terminal 2. A positive input terminal of the comparator 10 is grounded. The negative connection terminal 2 is connected through a resistor 14 to a voltage-dividing point of the resistors 11, 12.

Outputs of the comparators 9, 10 are supplied to the bases of npn transistors 15, 16, respectively. The collectors of the npn transistors 15, 16 are connected to the positive connection terminal 1. The emitters of the npn transistors 15, 16 are connected to junctions between the resistors 6 and 7.

The output of comparator 9 is connected to the ground through a collector-emitter path of an npn transistor 17. The base of npn transistor 17 is connected to the ground through a resistor 18. The negative connection terminal 2 is connected to the base of the npn transistor 17 through a resistor 19.

Accordingly, in this battery protection circuit, when neither load nor the battery charger is connected between the positive and negative connection terminals 1 and 2, and it is detected by the voltage detector 5 that the voltage across the terminals of the battery cell 3 is larger (e.g., 6 Volts) than the detection voltage (e.g., 5 Volts), then the voltage detector 5 supplies a bias voltage to the base of the npn transistor 4 from its output side through the resistors 6, 7 and the PTC 8 so that a very small current flows in the npn transistor 4.

At that time, since the collector voltage of the npn transistor 4 is low, the voltage at the positive input terminal of the comparator 9 is lower than the voltage at the negative input terminal. Hence, the output of the comparator 9 is held at low potential. Further, at that time, since the voltage at the negative input terminal of the comparator 10 is higher than the voltage at the positive input terminal, the output of the comparator 10 also is held at low potential. As a consequence, the npn transistors 15, 16 are both in their off-states.

When the load (not shown) is connected between the positive and negative terminals 1 and 2, a positive voltage is supplied to the collector of the npn transistor 4 through the load. As a result, the voltage at the positive input terminal of the comparator 9 is raised and the output of the comparator 9 is held at high potential. Hence, the base voltage of the npn transistor 4 increases and a collector current of 400 mA or greater flows in the npn transistor 4 to energize the battery cell 3. At that very moment, the output of the comparator 10 is held at low potential.

Under this condition, when the battery cell 3 is consumed and the input voltage of the voltage detector 5 becomes less than the detection voltage, the output of the voltage detector 5 becomes zero. Consequently, the comparator 9 is not supplied with the power supply voltage and the bias voltage supplied to the npn transistor 4 through the resistor 6 becomes zero so that the npn transistor 4 is turned off. Therefore, a dark current does not flow in the circuit and the battery cell 3 can be protected from excess discharge.

When the battery charger is connected between the positive and negative connection terminals 1 and 2, the collector of the npn transistor 4 is held at the negative voltage and the bias voltage is supplied to the base of the npn transistor 4 so that a current flows from the emitter to the collector of the npn transistor 4. Further, when the collector of the npn transistor 4 is held at the negative voltage, the voltage at the positive input terminal of the comparator 9 becomes lower than the voltage at the negative input terminal so that the output of the comparator 9 is held at low potential.

On the other hand, since the negative voltage is supplied to the negative input terminal of the comparator 10 and a zero potential is supplied to the positive input terminal of the comparator 10, the comparator 10 outputs a high potential. As a consequence, the npn transistor 16 is turned on so that a voltage obtained when an emitter current (base current of the transistor 4 as seen from the transistor 4 side) supplied through the transistor 16 flows through the resistor 7 and the PTC 8 is superimposed upon the base of the transistor 4. In other words, the bias current from the voltage detector 5 is equivalent to one on which the emitter current from the transistor 16 is superimposed. Therefore, the load is charged by a circuit formed of the positive connection terminal 1, the battery cell 3, the npn transistor 4 and the negative connection terminal 2, in that order.

When the positive and negative connection terminals 1 and 2 are short-circuited inadvertently, if the battery cell 3 has a voltage larger than the detection voltage (e.g., 5 Volts), then the voltage detector 5 supplies the bias voltage to the base of the npn transistor 4 so that a very small current flows in the npn transistor 4. Such current flowing in the npn transistor 4 is, however, too small to cause an accident.

Further, when the collector voltage of the npn transistor 4 becomes a predetermined voltage or greater, a voltage determined by the resistors 18, 19 is supplied to the base of the npn transistor 17 so that the comparator 9 is forced to output a low potential. Then, when the current progressively flows in the npn transistor 4 and the voltage of the battery cell 3 becomes smaller than the detection voltage, the output of the voltage detector 5 becomes zero and the bias voltage is not supplied to the base of the npn transistor, thereby the npn transistor 4 being turned off.

As described above, according to the battery protection circuit, when it is detected by the voltage detector 5 that the voltage across the terminals of the battery cell 3 is the predetermined value or greater, a very small current flows from the detecting means (voltage detector 5) to the electronic switch (npn transistor 4) to change one terminal voltage applied to the electronic switch 4 when the load or battery charger (not shown) is connected between the positive and negative connection terminals 1 and 2. Then, a current is supplied from the battery cell 3 to the load, or a charging current is supplied from the battery charger to the battery cell 3, by increasing a control voltage of the electronic switch 4 in response to the change of this terminal voltage. On the other hand, when it is detected by the voltage detector 5 that the voltage across the terminals of the battery cell 3 is the predetermined value or smaller, a connection between one of the positive and negative connection terminals 1, 2 and the battery cell 3 is disabled by interrupting the supply of the bias current to the electronic switch 4. Therefore, the battery protection circuit according to the present invention can protect the battery from the excess discharge satisfactorily.

The direction in which a current flows in the electronic switch 4 when the load is connected between the positive and negative terminals 1 and 2 and the direction in which a current flows in the electronic switch 4 when the battery charger is connected between the positive and negative terminals 1 and 2 can be made opposite to each other.

Since the battery protection circuit includes the discharge control means (comparator 9) for detecting that one terminal voltage of the electronic switch 4 is a positive voltage and which superimposes the control current upon the bias current such that an operation current of positive direction flows in the electronic switch 4 and the charge control means (comparator 10) for detecting that one terminal voltage of the electronic switch 4 is a negative voltage and which superimposes the control current upon the bias current such that an operation current of negative direction flows in the electronic switch 4, the electronic switch 4 can be formed by only one inexpensive transistor. Therefore, the battery protection circuit according to the present invention can be made inexpensive on the whole.

Further, since the battery protection circuit includes the means (resistor 14) for detecting that one terminal voltage of the electronic switch 4 is a positive voltage when the battery charger is connected to the positive and negative connection terminals 1 but 2 and the charging is stopped and which disables the charge control means (comparator 10), it is possible to prevent an undesirable dark current from flowing.

Furthermore, since the battery protection circuit includes the high voltage detecting means (npn transistor 17 and resistors 18, 19) for detecting that one terminal voltage of the electronic switch 4 is the positive voltage and is the predetermined value or greater and wherein the output from the discharge control means (comparator 9) is interrupted when the high voltage detecting means detects a voltage larger than the predetermined value, the temperature detecting circuit (PTC 8) can be prevented from chattering due to a very small temperature change occurring after the terminals are short-circuited. Therefore, the battery protection circuit according to this embodiment can be operated satisfactorily. Thus, it is possible to provide a battery protection circuit which is highly reliable.

Since the operation voltage is supplied to the discharge control means (comparator 9) and the charge control means (comparator 10) through the predetermined terminal voltage detecting means (voltage detector 5), it is possible to considerably reduce a dark current which flows in these circuits provided within the battery protection circuit.

Since the temperature detecting means (PTC 8) is connected in series to the line through which the bias current is supplied to the electronic switch 4, if the current supplied to the electronic switch 4 is controlled so as to become the predetermined value in response to the detected temperature from the temperature detecting means, then it is possible to obtain the battery protection circuit which can be operated stably. In particular, it is possible to prevent the temperature of the battery cell 3 from rising extraordinarily due to an abnormal charging or the like.

While the PTC 8 serving as the temperature detecting means is connected at the illustrated position in FIG. 1 as described above, the present invention is not limited thereto and the PTC 8 may be connected at a dotted-line position a in FIG. 1. In this case, since the bias current is not supplied to the PTC 8 during a period other than the charging period, it is possible to lessen an electric power consumed by the PTC 8.

Further, While the comparators 9, 10 are operated by the output from the voltage detector 5 as described above, the present invention is not limited thereto and the comparators 9, 10 may be operated by an output from a dark current limiting Zener diode shown by in phantom at b in FIG. 1.

Furthermore, while the above-mentioned battery protection circuit is housed in the battery pack as described above, the present invention is not limited thereto and the battery protection circuit may be housed in a battery charger or device operated by a battery.

Figure 2:
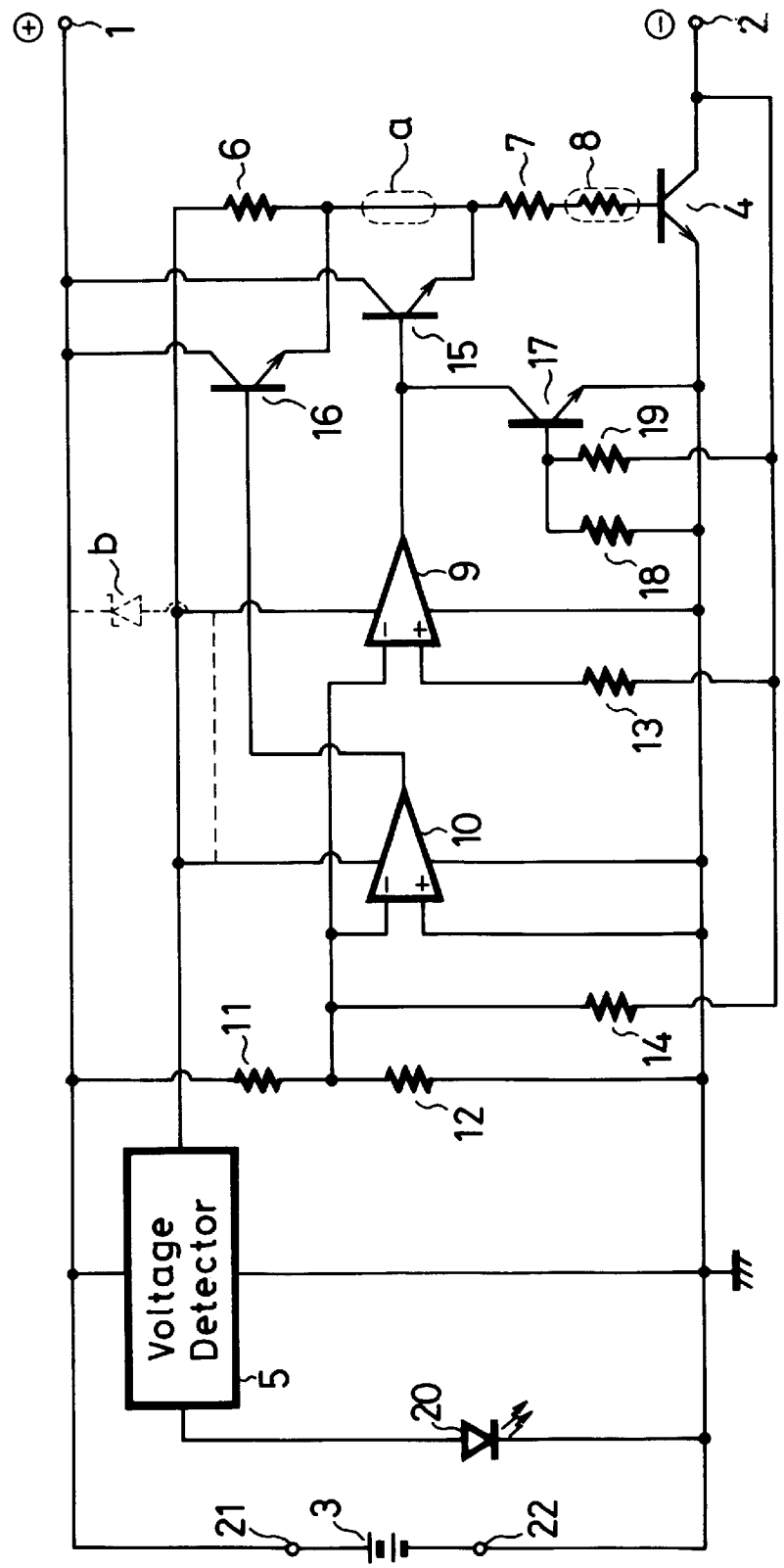
FIG. 2 is a diagram showing a circuit arrangement of a battery protection circuit according to a second embodiment of the present invention.

FIG. 2 is a diagram showing a battery protection circuit according to a second embodiment of the present invention. In FIG. 2, elements and parts identical to those of FIG. 1 are marked with the same references and therefore need not be described in detail.

According to this embodiment, the battery cell 3 can be formed separately from the above-mentioned battery protection circuit. Specifically, as shown in FIG. 2, the battery cell 3 can be formed separately from the battery protection circuit by connecting connection terminals 21, 22 to both ends of the battery cell 3.

With the above-mentioned arrangement, the battery protection circuit according to the present invention can be applied to the existing battery pack and load. If this circuit is formed as an adaptor, then the above-mentioned operation can be carried out by connecting this adaptor between the battery cell 3 and the load.

If there are provided a plurality of sets of the connection terminals 1 and 2 of the load side, then the battery protection circuit according to the present invention can be applied to an adaptor which can supply a voltage to both of a video camera and a lighting equipment.

According to the present invention, since the battery cell 3 is formed separately from the battery protection circuit and connected through the connection terminals 21, 22 which are different from the positive and negative connection terminals 1, 2 to the battery protection circuit and this circuit is provided between the battery cell 3 and the load as and adaptor, it is possible to provide a battery protection circuit which can be satisfactorily applied to the existing battery pack and load.

In the above-mentioned battery protection circuit, the voltage detector 5 constantly detects the voltage of the battery cell 3. Accordingly, if a signal from the voltage detector 5 is supplied to a light-emitting diode 20, then the light-emitting diode 20 can indicate a remaining battery amount of the battery cell 3. More specifically, the remaining battery amount of the battery cell 3 can be indicated by use of a circuit disclosed in Japanese patent application No. 4-353605 (Japanese laid-open patent publication No. 6-189461)) that has been filed by the same assignee of this application.

As described above, according to the battery protection circuit of this second embodiment of the present invention, since the battery protection circuit includes the indication means (light-emitting diode 20) which carries out an indication corresponding to the voltage detected by the detection means (voltage detector 5), it is possible to satisfactorily indicate the remaining battery amount of the battery cell 3.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A battery protection circuit comprising:

first and second connection terminals to which one of a load or a battery charger is connected;

a battery cell;

a transistor switch having a collector terminal and an emitter terminal connected between said second connection terminal and said battery cell, respectively, forming a series connection with said battery cell; and detecting means connected to said battery cell for detecting a voltage of said battery cell, wherein when it is detected by said detecting means that said voltage of said battery cell is a predetermined value or greater, a low bias current flows from said detecting means to a base terminal of said transistor switch to change a collector terminal voltage of said transistor switch obtained when said load or battery charger is connected to said first and second connection terminals, whereby a positive current flowing from said battery cell to said load or a negative charging current flowing from said battery charger to said battery cell is controlled by increasing a control voltage applied to said base terminal of said transistor switch in response to a change of said collector terminal voltage of said transistor switch connected to said second connection terminal, and wherein when it is detected by said detecting means that said voltage of said battery cell is smaller than said predetermined value, a connection between said second connection terminal and said battery cell is disabled by interrupting the supply of said bias current to said base terminal of said transistor switch, thereby turning said transistor switch off.

2. The battery protection circuit according to claim 1, further comprising:

discharge control means for detecting that said collector terminal voltage of said transistor switch connected to said second connection terminal is a positive voltage and superimposing a control current upon said bias current such that an operation current of positive direction flows in said transistor switch; and charge control means for detecting that said collector terminal voltage of said transistor switch is a negative voltage and superimposing a control current upon said bias current such that an operation current of negative direction flows in said transistor switch.

3. The battery protection circuit according to claim 2, further comprising means for detecting that said collector terminal voltage of said electronic switch is a positive voltage and for disabling said charge control means when said battery charger is connected to said first and second connection terminals and a charging operation is stopped.

4. The battery protection circuit according to claim 2, further comprising high voltage detecting means for detecting that said collector terminal voltage of said electronic switch is a positive voltage and is larger than a predetermined value and for interrupting an output of said discharge control means when said high voltage detecting means detects a voltage larger than said predetermined value.

5. The battery protection circuit according to claim 2, 3, or 4, wherein a voltage is supplied to said discharge control means and said charge control means by said detecting means for detecting a voltage of said battery cell.

6. A battery protection circuit comprising:

first and second connection terminals to which one of a load or a battery charger is connected;

a battery cell;

a transistor switch having a collector terminal and an emitter terminal connected between said second connection terminal and said battery cell, respectively, forming a series connection with said cell; and detecting means connected to said battery cell for detecting a voltage of said battery cell, wherein when it is detected by said detecting means that said voltage of said battery cell is a predetermined value or greater, a low bias current flows from said detecting means to a base terminal of said transistor switch to change a collector terminal voltage of said transistor switch obtained when said load or battery charger is connected to said first and second connection terminals, whereby a positive current flowing from said battery cell to said load or a negative of charging current flowing from said battery charger to said battery cell is controlled by increasing a control voltage applied to said base terminal of said transistor switch in response to a change of said collector terminal voltage of said transistor switch connected to said second connection terminal, and wherein when it is detected by said detecting means that said voltage of said battery cell is smaller than said predetermined value, a connection between said second connection terminal and said battery cell is disabled by interrupting the supply of said bias current to said base terminal of said transistor switch, thereby turning said transistor switch off; and further comprising temperature detecting means connected in series in a line through which said bias current is supplied to said base terminal of said transistor switch, whereby said bias current is controlled to be a predetermined value in response to a detected temperature of said temperature detecting means.

7. The battery protection circuit according to any one of claims 1, 2, 3, 4, or 6, wherein said battery cell is connected to said electronic switch and said detecting means through connection terminals separate from said first and second connection terminals.

8. A battery protection circuit according to any one of claims 1, 2, 3, 4, or 6, further comprising indication means for effecting an indication corresponding to a voltage detected by said detecting means.

* * * * *